(12) United States Patent
Hasegawa

(10) Patent No.: US 11,951,632 B2
(45) Date of Patent: Apr. 9, 2024

(54) ROBOTIC SYSTEM AND CONTROL DEVICE

(71) Applicant: Seiko Epson Corporation, Toyko (JP)

(72) Inventor: Fumiaki Hasegawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 625 days.

(21) Appl. No.: 17/161,749

(22) Filed: Jan. 29, 2021

(65) Prior Publication Data

US 2021/0237273 A1 Aug. 5, 2021

(30) Foreign Application Priority Data

Jan. 30, 2020 (JP) ................................. 2020-013340

(51) Int. Cl.
  *B25J 9/16* (2006.01)
  *B25J 13/08* (2006.01)
  *B25J 19/00* (2006.01)

(52) U.S. Cl.
  CPC ........... *B25J 9/1674* (2013.01); *B25J 13/087* (2013.01); *B25J 19/005* (2013.01)

(58) Field of Classification Search
  CPC ....... B25J 9/1674; B25J 13/087; B25J 19/005
  See application file for complete search history.

(56) References Cited

U.S. PATENT DOCUMENTS

| | | | |
|---|---|---|---|
| 7,405,571 B1* | 7/2008 | Liu ..................... | G01R 31/3835 |
| | | | 702/65 |
| 2005/0275372 A1* | 12/2005 | Crowell ................ | H02J 7/0018 |
| | | | 320/112 |
| 2008/0036904 A1 | 2/2008 | Taneoka | |
| 2016/0276851 A1* | 9/2016 | Shani ..................... | H02J 7/0047 |
| 2017/0216120 A1 | 8/2017 | Tsusaka et al. | |
| 2019/0369625 A1* | 12/2019 | Chen .................... | G05D 1/0297 |

FOREIGN PATENT DOCUMENTS

| | | |
|---|---|---|
| CN | 109494833 A | 3/2019 |
| JP | 2006-150562 A | 6/2006 |
| JP | 2008-046179 A | 2/2008 |
| JP | 2010-206706 A | 9/2010 |
| JP | 2017-136681 A | 8/2017 |
| JP | 2018-054574 A | 4/2018 |
| JP | 2018-060728 A | 4/2018 |

OTHER PUBLICATIONS

Search Report of the First Office Action CN Application No. 2021101215763 dated Apr. 28, 2023.

* cited by examiner

*Primary Examiner* — Gary Collins
(74) *Attorney, Agent, or Firm* — Samson G. Yu

(57) ABSTRACT

A robotic system includes a robot driven using a battery as a power supply source, and a control device configured to control the robot. The control device executes a setting process of making the robot repeatedly execute a first operation from when the battery is fully charged to when an output voltage of the battery becomes not higher than a predetermined threshold value, and setting a number of times the robot executes the first operation in a range in which the output voltage of the battery is higher than the threshold value as a first upper-limit number of times which is an upper limit of a number of times the robot can be made to execute the first operation in a period from when the battery is fully charged to when the battery is recharged.

6 Claims, 5 Drawing Sheets

ROBOTIC SYSTEM AND CONTROL DEVICE

The present application is based on, and claims priority from JP Application Serial Number 2020-013340, filed Jan. 30, 2020, the disclosure of which is hereby incorporated by reference herein in its entirety.

BACKGROUND

1. Technical Field

The present disclosure relates to a robotic system and a control device.

2. Related Art

In JP-A-2006-150562, there is described a robot driven using a battery as a power supply source. The robot prevents the robot in operation from stopping due to flat battery by determining whether or not the remaining battery charge necessary for performing an operation is ensured using the remaining battery charge detected and information related to the power consumption for each of the operations stored in a database, and then providing the determination result to the user, or switching the operation to be executed.

In the robot described above, it is required to store the information related to the power consumption for each of the operations in order to manage the remaining charge of the battery, and therefore, time and effort for calculating the power consumption imposes on the user as a result.

SUMMARY

According to a first aspect of the present disclosure, there is provided a robotic system. The robotic system includes a robot driven using a battery as a power supply source, and a control device configured to control the robot. The control device executes a setting process of making the robot repeatedly execute a first operation from when the battery is fully charged to when an output voltage of the battery becomes not higher than a predetermined threshold value, and setting a number of times the robot executes the first operation in a range in which the output voltage of the battery is higher than the threshold value as a first upper-limit number of times which is an upper limit of a number of times the robot can be made to execute the first operation in a period from when the battery is fully charged to when the battery is recharged.

According to a second aspect of the present disclosure, there is provided a control device configured to control a robot driven using a battery as a power supply source. The control device includes a voltage acquisition section configured to obtain an output voltage of the battery, and an upper-limit number-of-times storage section configured to store an upper-limit number of times which is an upper limit of a number of times the robot can be made to execute an operation in a period from when the battery is fully charged to when the battery is recharged. The control device executes a setting process of making the robot repeatedly execute the operation from when the battery is fully charged to when the output voltage of the battery obtained by the voltage acquisition section becomes not higher than a predetermined threshold value to obtain a number of times the robot executed the operation within a range in which the output voltage of the battery is higher than the threshold value, and then storing the number of times obtained in the upper-limit number-of-times storage section as the upper limit number of times.

DESCRIPTION OF AN EXEMPLARY EMBODIMENT

A. First Embodiment

Figure 1:
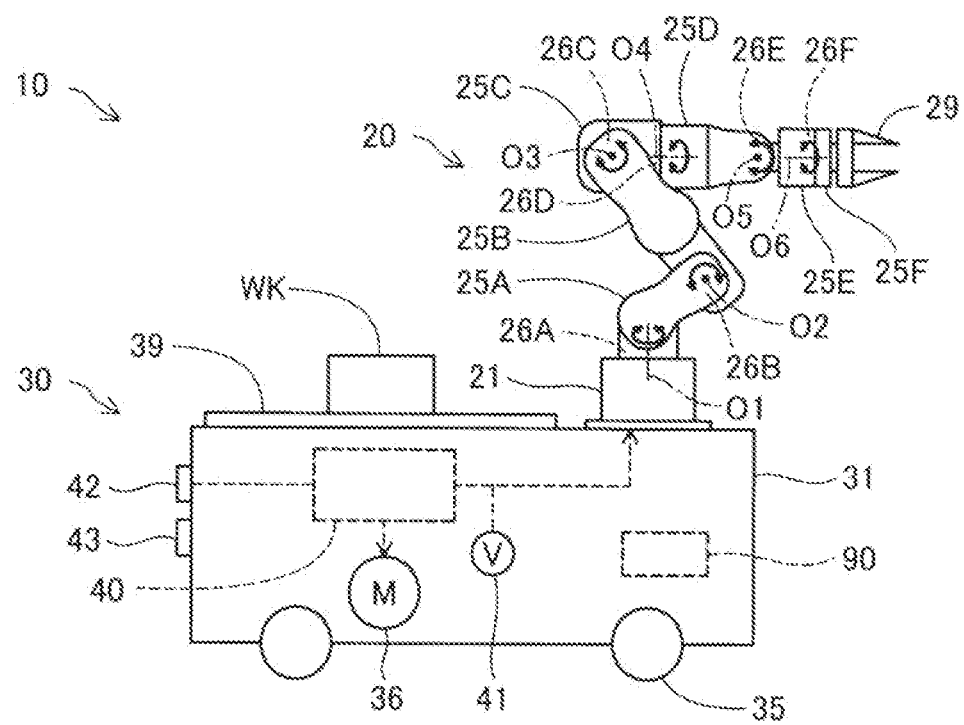
FIG. 1 is an explanatory diagram showing a schematic configuration of a robotic system according to a first embodiment.

FIG. 1 is an explanatory diagram showing a schematic configuration of a robotic system 10 according to a first embodiment. In the present embodiment, the robotic system 10 is provided with a robot 20, a vehicle section 30, a battery 40, a voltmeter 41, and a control device 90. The robotic system 10 is capable of, for example, loading a work WK on the vehicle section 30 with the robot 20 at a first point, running from the first point to a second point with the vehicle section 30, and then unloading the work WK from the vehicle section 30 with the robot 20 at the second point. It should be noted that the robot 20 can be called a manipulator, the vehicle section 30 can be called a vehicle, and the control device 90 can be called a controller.

The robot 20 is provided with a base part 21, a first arm part 25A, a second arm part 25B, a third arm part 25C, a fourth arm part 25D, a fifth arm part 25E, a sixth arm part 25F, a first motor 26A, a second motor 26B, a third motor 26C, a fourth motor 26D, a fifth motor 26E, a sixth motor 26F, and an end effector 29. In the present embodiment, the robot 20 is configured as a vertical articulated robot. It should be noted that the characters "A" through "F" attached as the tails of the reference symbols of the arm parts 25A through 25F and the motors 26A through 26F are characters attached in order to distinguish the arm parts 25A through 25F and the motors 26A through 26F from each other. In the following description, when providing the description without particularly distinguishing the arm parts 25A through 25F and the motors 26A through 26F from each other, the description will be presented without attaching the characters "A" through "F" to the tails of the reference symbols. The base part 21 can be called a base, and the arm part 25 can be called an arm.

The base part 21 is fixed to the vehicle section 30. The first arm part 25A is coupled to the base part 21 so as to be able to rotate around a first axis O1. The second arm part 25B is coupled to the first arm part 25A so as to be able to rotate around a second axis O2. The third arm part 25C is coupled to the second arm part 25B so as to be able to rotate around a third axis O3. The fourth arm part 25D is coupled to the third arm part 25C so as to be able to rotate around a fourth axis O4. The fifth arm part 25E is coupled to the fourth arm part 25D so as to be able to rotate around a fifth axis O5. The sixth arm part 25F is coupled to the fifth arm part 25E so as to be able to rotate around a sixth axis O6. The end effector 29 is mounted on a tip portion of the sixth arm part 25F. In the present embodiment, the end effector 29 is formed of a gripper capable of gripping the work WK.

The first motor 26A rotates the first arm part 25A with respect to the base part 21. The second motor 26B rotates the second arm part 25B with respect to the first arm part 25A. The third motor 26C rotates the third arm part 25C with respect to the second arm part 25B. The fourth motor 26D rotates the fourth arm part 25D with respect to the third arm part 25C. The fifth motor 26E rotates the fifth arm part 25E with respect to the fourth arm part 25D. The sixth motor 26F rotates the sixth arm part 25F with respect to the fifth arm part 25E. The motors 26A through 26F are each controlled individually by the control device 90. The motors 26A through 26F are each driven using the battery 40 as the power supply source. In the present embodiment, the motors 26A through 26F are each formed of an AC motor. The DC power output by the battery 40 is converted by an inverter into the AC power, and the AC power is supplied to each of the motors 26A through 26F. It is possible for each of the motors 26A through 26F to be formed of a DC motor.

The robot 20 is not limited to the configuration described above. For example, the robot 20 can be provided with a configuration provided with one through five arm parts 25 and one through five motors 26 or a configuration provided with seven or more arm parts 25 and seven or more motors 26 instead of the configuration provided with the six arm parts 25 and the six motors 26 as described above. Further, for example, the robot 20 can also be configured as a horizontal articulated robot instead of the vertical articulated robot. The robotic system 10 can be provided with two or more robots 20.

The vehicle section 30 is provided with a vehicle body part 31, a wheel part 35, and a running motor 36. In the present embodiment, the vehicle section 30 is configured as an AGV (Automated Guided Vehicle) traveling while being guided by the magnetic tape or the like disposed on a predetermined traveling path. The vehicle section 30 can also be configured as an AMR (Autonomous Mobile Robot) which automatically calculates the traveling path, and travels while avoiding a human and an obstacle when the human or the obstacle has been detected on the traveling path.

To the upper surface of the vehicle body part 31, there is fixed the base part 21 of the robot 20. A loading part 39 for loading the work WK is disposed next to a part to which the base part 21 is fixed in the upper surface of the vehicle body part 31. On the vehicle body part 31, there is mounted the running motor 36. The running motor 36 is driven under the control by the control device 90. The running motor 36 is driven using the battery 40 as the power supply source to rotate the wheel section 35. The vehicle section 30 runs due to the rotation of the wheel section 35. In the present embodiment, the running motor 36 is formed of an AC motor. The DC power output by the battery 40 is converted by an inverter into the AC power, and the AC power is supplied to the running motor 36. The running motor 36 can be formed of a DC motor. It should be noted that the vehicle body part 31 can be called a vehicle body, the wheel section 35 can be called wheels, and the loading section 39 can be called a loading platform.

The battery 40 and the voltmeter 41 are mounted on the vehicle body part 31. The battery 40 is formed of a secondary cell which can be charged and discharged. As the battery 40, there can be used, for example, a lithium-ion battery or a nickel-metal-hydride battery. The voltmeter 41 measures the output voltage of the battery 40. The output voltage of the battery 40 measured by the voltmeter 41 is transmitted to the control device 90. In the present embodiment, the vehicle body part 31 is provided with a charge connector 42 for charging the battery 40, and an announcing section 43 for announcing the fact that charging is necessary when it is necessary to charge the battery 40. The announcing section 43 is formed of, for example, a warning light or a buzzer driven under the control by the control device 90. The robotic system 10 is configured so that the battery 40 can be replaced not only with a secondary cell of the same in type as the battery 40 having been mounted, but also with a secondary cell different in type from the battery 40 having been mounted. For example, it is possible for the battery 40 to be replaced with a lithium-ion battery manufactured by a manufacturer different from the manufacturer which manufactures the lithium-ion battery having been mounted, or can also be replaced with a nickel-metal-hydride battery instead of the lithium-ion battery. In the following description, the fact that the secondary cell such as the battery 40 is in the state in which there is no room for being further charged, namely the state in which the secondary cell such as the battery 40 has sufficiently been charged is expressed as "full charge" or "fully charged" in some cases.

The control device 90 is mounted on the vehicle body part 31. The control device 90 is formed of a computer provided with a single processor or a plurality of processors, a main storage device, and an input/output interface for performing input/output of a signal with the outside. The control device 90 exerts a variety of functions including an upper-limit number-of-times setting process and an operation sequence execution process described later by the processor executing programs and commands retrieved on the main storage device. The control device 90 can be realized by a configuration obtained by combining a plurality of circuits for executing at least a part of each of the functions with each other instead of being formed of the computer. It should be noted that the control device 90 can be incorporated in the robot 20.

Figure 2:
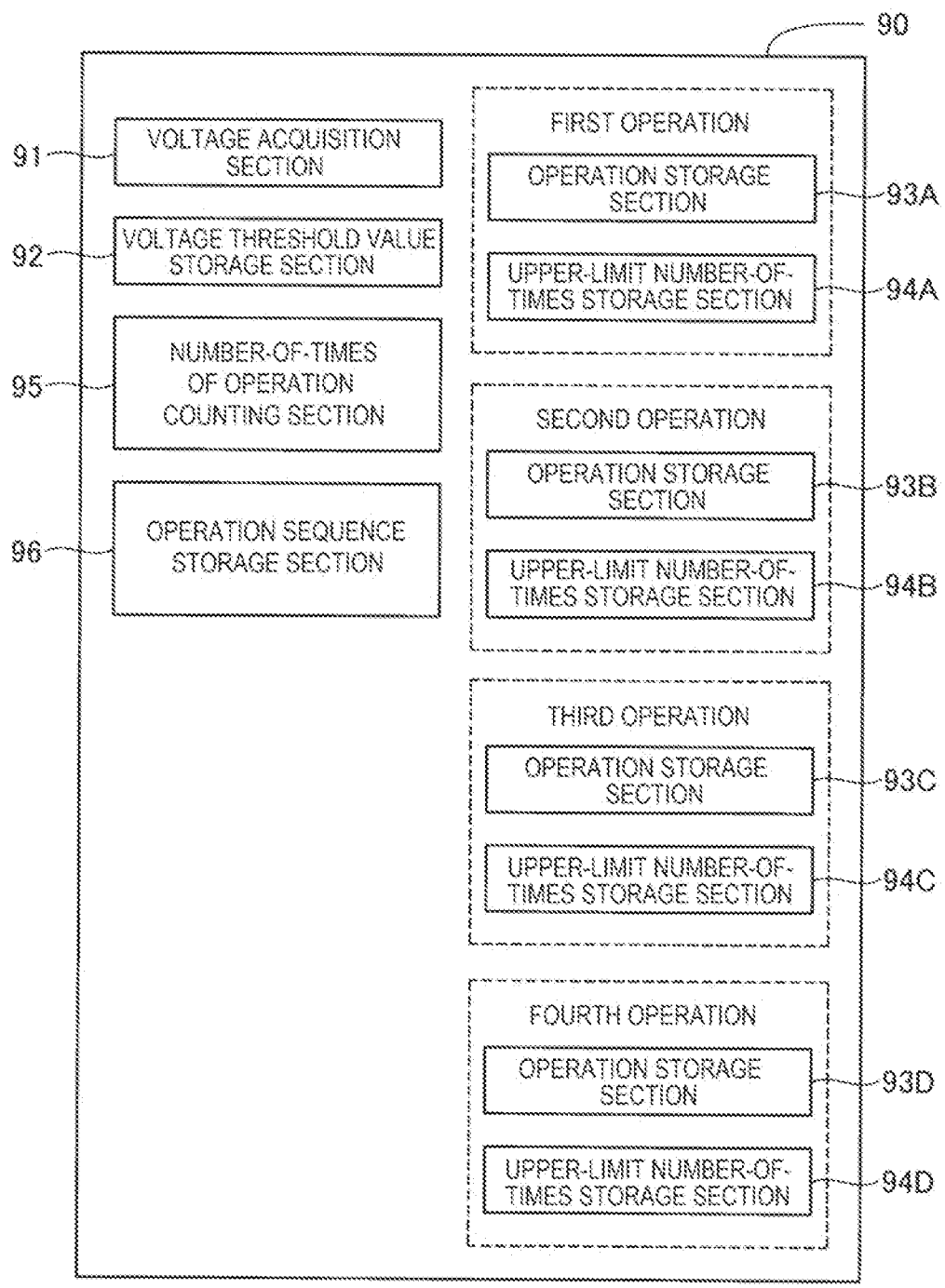
FIG. 2 is an explanatory diagram showing a schematic configuration of a control device according to the first embodiment.

FIG. 2 is an explanatory diagram showing a schematic configuration of the control device 90 in the present embodiment. In the present embodiment, the control device 90 is provided with a voltage acquisition section 91, a voltage threshold value storage section 92, a first operation storage section 93A, a first upper-limit number-of-times storage section 94A, a second operation storage section 93B, a second upper-limit number-of-times storage section 94B, a third operation storage section 93C, a third upper-limit number-of-times storage section 94C, a fourth operation storage section 93D, a fourth upper-limit number-of-times storage section 94D, a number-of-times of operation counting section 95, and an operation sequence storage section 96. It should be noted that the characters "A" through "D" attached to the tails of the reference symbols of the operation storage sections 93A through 93D and the upper-limit number-of-times storage sections 94A through 94D are characters attached in order to distinguish the operation storage sections 93A through 93D and the upper-limit number-of-times storage sections 94A through 94D from each other. In the following description, when providing the description without particularly distinguishing the operation storage sections 93A through 93D and the upper-limit number-of-times storage sections 94A through 94D from each other, the description will be presented without attaching the characters "A" through "D" to the tails of the reference symbols.

The voltage acquisition section 91 obtains the output voltage of the battery 40 measured by the voltmeter 41. The voltage threshold value storage section 92 stores the threshold value of the output voltage of the battery 40 used for the upper-limit number-or-times setting process and so on. The voltage threshold value storage section 92 stores the threshold value input by, for example, the user.

The first operation storage section 93A stores the content of a first operation to be executed by the robotic system 10. In the present embodiment, the first operation having the content that the work WK is loaded by the robot 20 on the loading section 39 is stored in the first operation storage section 93A. The first upper-limit number-of-times storage section 94A stores a first upper-limit number of times which is an upper limit of the number of times the control device 90 can make the robotic system 10 execute the first operation when the control device 90 makes the robotic system 10 execute only the first operation in the period from when the battery 40 is fully charged to when the battery 40 is subsequently recharged. The first upper-limit number of times is stored in the first upper-limit number-of-times storage section 94A due to an upper-limit number-of-times setting process described later.

The second operation storage section 93B stores the content of a second operation to be executed by the robotic system 10. In the present embodiment, the second operation having the content that traveling from a first point to a second point is performed by the vehicle section 30 is stored in the second operation storage section 93B. The second upper-limit number-of-times storage section 94B stores a second upper-limit number of times which is an upper limit of the number of times the control device 90 can make the robotic system 10 execute the second operation when the control device 90 makes the robotic system 10 execute only the second operation in the period from when the battery 40 is fully charged to when the battery 40 is subsequently recharged. The second upper-limit number of times is stored in the second upper-limit number-of-times storage section 94B due to the upper-limit number-of-times setting process described later.

The third operation storage section 93C stores the content of a third operation to be executed by the robotic system 10. In the present embodiment, the third operation having the content that the work WK is unloaded by the robot 20 from the loading section 39 is stored in the third operation storage section 93C. The third upper-limit number-of-times storage section 94C stores a third upper-limit number of times which is an upper limit of the number of times the control device 90 can make the robotic system 10 execute the third operation when the control device 90 makes the robotic system 10 execute only the third operation in the period from when the battery 40 is fully charged to when the battery 40 is subsequently recharged. The third upper-limit number of times is stored in the third upper-limit number-of-times storage section 94C due to the upper-limit number-of-times setting process described later.

The fourth operation storage section 93D stores the content of a fourth operation to be executed by the robotic system 10. In the present embodiment, the fourth operation having the content that traveling from the second point to the first point is performed by the vehicle section 30 is stored in the fourth operation storage section 93D. The fourth upper-limit number-of-times storage section 94D stores a fourth upper-limit number of times which is an upper limit of the number of times the control device 90 can make the robotic system 10 execute the fourth operation when the control device 90 makes the robotic system 10 execute only the fourth operation in the period from when the battery 40 is fully charged to when the battery 40 is subsequently recharged. The fourth upper-limit number of times is stored in the fourth upper-limit number-of-times storage section 94D due to the upper-limit number-of-times setting process described later.

The number-of-times of operation counting section 95 counts each of the number of times the first operation has been executed, the number of times the second operation has been executed, the number of times the third operation has been executed, and the number of times the fourth operation has been executed in the period from when the battery 40 has fully been charged to when the battery 40 is subsequently recharged, and then stores the result. The numbers of times stored in the number-of-times of operation counting section 95 are restored to 0 when the battery 40 is recharged.

The operation sequence storage section 96 stores an operation sequence of making the robotic system 10 execute the operations stored in the respective operation storage sections 93A through 93D in a predetermined order. In the present embodiment, there is stored the operation sequence having the content that the robotic system 10 is made to execute the first operation, the second operation, the third operation, and the fourth operation in this order.

The control device 90 is not limited to the configuration described above. For example, the control device 90 can be provided with a configuration provided with one through three operation storage sections 93 and one through three upper-limit number-of-times storage sections 94, or a configuration provided with five or more operation storage sections 93 and five or more upper-limit number-of-times storage sections 94 instead of the configuration provided with the four operation storage section 93 and the four upper-limit number-of-times storage sections 94 described above.

Figure 3:
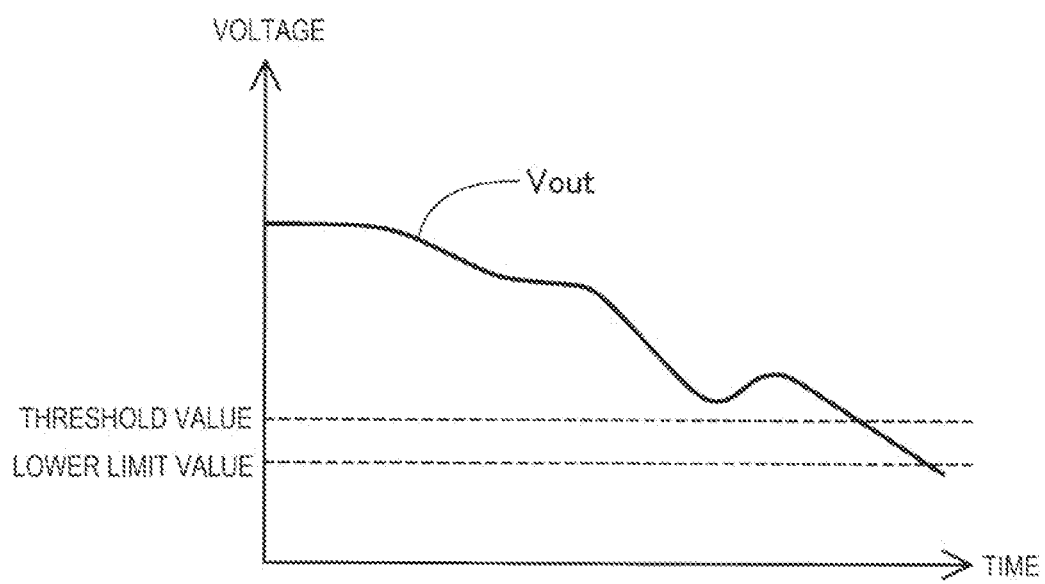
FIG. 3 is an explanatory diagram schematically showing a transition of an output voltage of a battery.

FIG. 3 is an explanatory diagram showing a transition of the output voltage of the battery 40. In FIG. 3, the horizontal axis represents time, and the vertical axis represents voltage. FIG. 3 schematically shows the transition of the output voltage Vout of the battery 40 when making the robotic system 10 continuously execute an operation. When making the robotic system 10 execute the operation by supplying the power to the motors 26 of the robot 20 and the running motor 36 of the vehicle section 30 from the battery 40, the output voltage Vout of the battery 40 drops. When the output voltage Vout of the battery 40 drops below a lower limit value, the robotic system 10 becomes unable to execute the operation. Therefore, in the present embodiment, a threshold value higher than the lower limit value is stored in the voltage threshold value storage section 92 of the control device 90.

Figure 4:
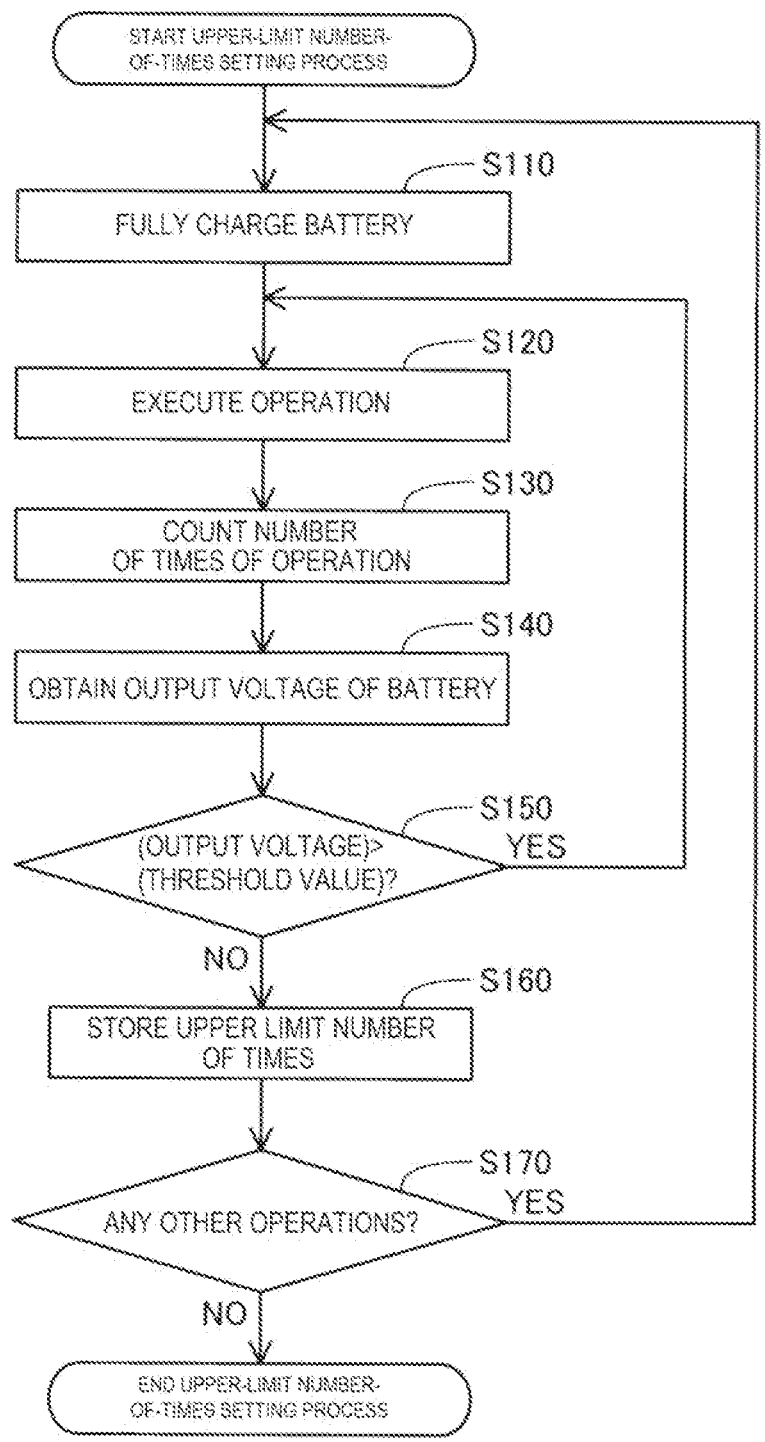
FIG. 4 is a flowchart showing the content of an upper-limit number-of-times setting process.

FIG. 4 is a flowchart showing the content of the upper-limit number-of-times setting process in the present embodiment. This processing is executed by the control device 90 prior to the operation sequence execution process described later. This processing is also executed by the control device 90 when the battery 40 is replaced. First, in the step S110, the control device 90 waits until the battery 40 is fully charged. On this occasion, when the charging of the battery 40 does not start, it is possible for the control device 90 to announce the fact that the charging of the battery 40 is necessary to the user with the announcing section 43. It should be noted that the upper-limit number-of-times setting process is also referred to simply as a setting process in some cases.

After the battery 40 is fully charged, in the step S120, the control device 90 makes the robotic system 10 execute once the first operation stored in the first operation storage section 93A. In the step S130, the control device 90 counts the number of times the robotic system 10 has been made to execute the first operation since the battery 40 was fully charged, and then stores the result using the number-of-times of operation counting section 95. Since the number of times the robotic system 10 has been made to execute the first operation since the battery 40 was fully charged becomes one, one is stored in the number-of-times of operation counting section 95. In the step S140, the control device 90 obtains the output voltage of the battery 40 using the voltage acquisition section 91. In the step S150, the control device 90 determines whether or not the output voltage of the battery 40 obtained by the voltage acquisition section 91 is higher than the threshold value stored in the voltage threshold value storage section 92.

When it has been determined in the step S150 that the output voltage of the battery 40 is higher than the threshold value stored in the voltage threshold value storage section 92, the control device 90 returns the process to the step S120, and then executes the processing from the step S120 to the step S150 once again. Since the number of times the robotic system 10 has been made to execute the first operation since the battery 40 was fully charged becomes two due to the processing in the step S120 executed in the second round, two is stored in the number-of-times of operation counting section 95 in the processing in the step S130 executed in the second round. The control device 90 repeatedly executes the processing from the step S120 to the step S150 until it becomes no longer determined in the step S150 that the output voltage of the battery 40 is higher than the threshold value stored in the voltage threshold value storage section 92.

When it has not been determined in the step S150 that the output voltage of the battery 40 is higher than the threshold value stored in the voltage threshold value storage section 92, namely when the output voltage of the battery 40 is not higher than the threshold value stored in the voltage threshold value storage section 92, the control device 90 stores the number of times of the execution of the first operation, which is stored in the number-of-times of operation counting section 95, in the first upper-limit number-of-times storage section 94A as the first upper-limit number of times in the step S160. For example, when the number of times of the execution of the first operation stored in the number-of-times of operation counting section 95 is fifty, fifty is stored in the first upper-limit number-of-times storage section 94A as the first upper-limit number of times.

Subsequently, in the step S170, the control device 90 determines whether or not any other operations are stored in the operation storage sections 93A through 93D. When it has been determined in the step S170 that another operation is stored in the operation storage sections 93A through 93D, the control device 90 returns the process to the step S110, and then executes the processing from the step S110 to the step S170 once again. In the present embodiment, since the second operation different from the first operation is stored in the second operation storage section 93B, the control device 90 determines in the step S170 that another operation is stored in the operation storage sections 93A through 93D. After the battery 40 is fully charged in the step S110 once again, the control device 90 executes the processing from the step S120 to the step S160 to thereby store the second upper-limit number of times in the second upper-limit number-of-times storage section 94B, and executes the processing in the step S170 to thereby determine whether or not any other operations are stored in the operation storage sections 93A through 93D. In the present embodiment, since the third operation which is different from the first operation, and is different from the second operation is stored in the third operation storage section 93C, the control device 90 determines in the step S170 that another operation is stored in the operation storage sections 93A through 93D.

The control device 90 repeatedly executes the processing from the step S110 to the step S170 to store the upper-limit number of times in each of the upper-limit number-of-times storage sections 94A through 94D until it becomes no longer determined in the step S170 that another operation is stored in the operation storage sections 93A through 93D. When it has not been determined in the step S170 that another operation is stored, the control device 90 terminates this process. Subsequently, when the battery 40 is replaced, the control device 90 executes this process once again. It should be noted that the threshold value stored in the voltage threshold value storage section 92 can be changed before the process is executed once again.

Figure 5:
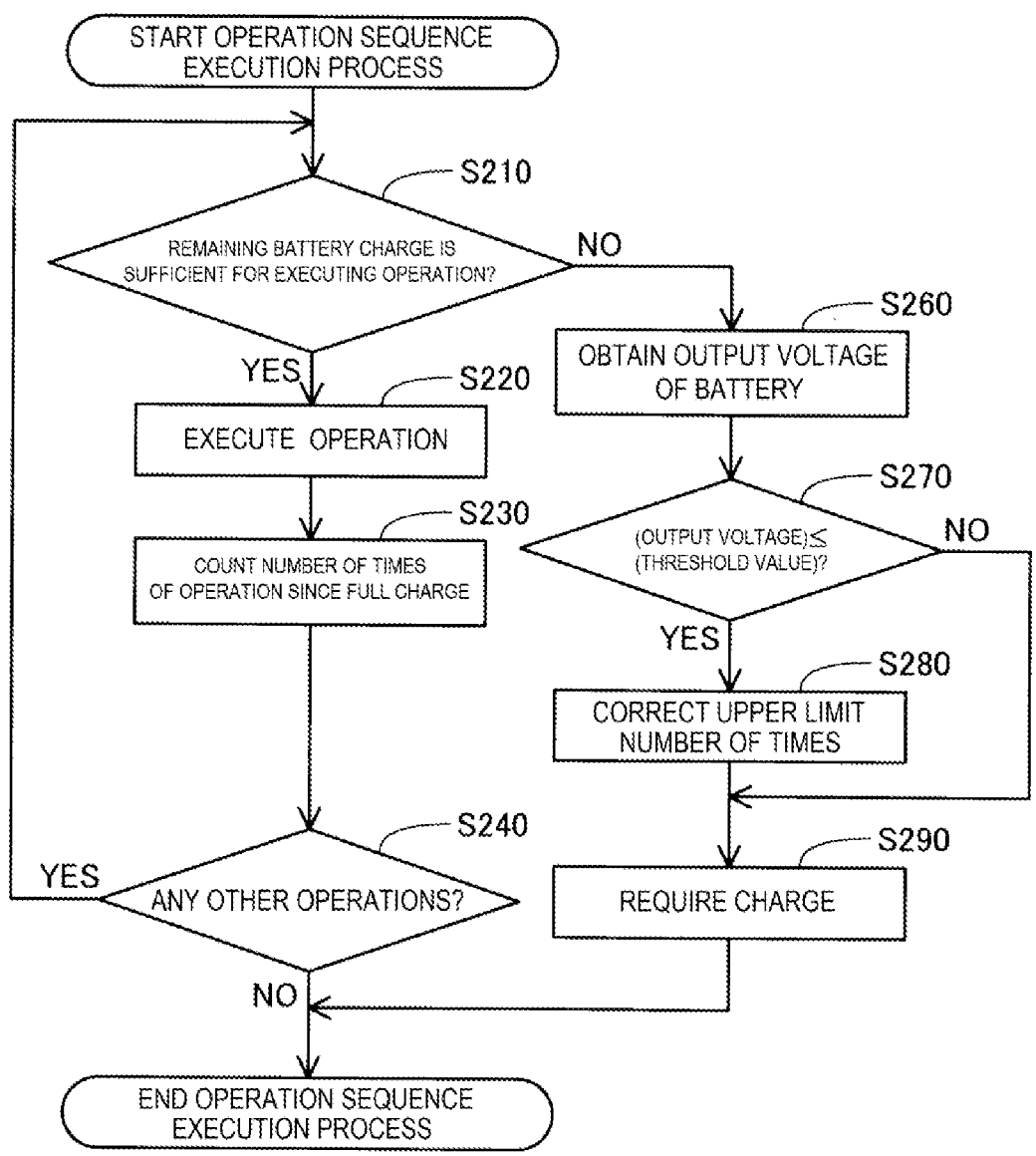
FIG. 5 is a flowchart showing the content of an operation sequence execution process.

FIG. 5 is a flowchart showing the content of the operation sequence execution process. This process is executed by the control device 90 in response to a predetermined start command supplied to the control device 90. First, in the step S210, the control device 90 determines whether or not the remaining charge of the battery 40 for executing the first operation as first one of the operations represented by the operation sequence is reserved.

In the present embodiment, the control device 90 calculates the power consumption proportion of each of the operations using the upper-limit number of times stored in each of the upper-limit number-of-times storage sections 94A through 94D, and then determines whether or not the remaining charge of the battery 40 is reserved using the power consumption proportions of the respective operations and the number of times each of the operations has been executed since the battery 40 was fully charged stored in the number-of-times of operation counting section 95. The power consumption proportion means the proportion of an amount of the power to be consumed for making the robotic system 10 execute the operation once to an amount of the power the battery 40 can output within a range in which the output voltage of the battery 40 does not drop to the threshold value or less since the battery 40 was fully charged. The power consumption proportion of the first operation is referred to as a first power consumption proportion, the power consumption proportion of the second operation is referred to as a second power consumption proportion, the power consumption proportion of the third operation is referred to as a third power consumption proportion, and the power consumption proportion of the fourth operation is referred to as a fourth power consumption proportion. For example, when the first upper-limit number of times and the third upper-limit number of times are each fifty, and the second upper-limit number of times and the fourth upper-limit number of times are each seventy, the control device 90 uniforms the denominators of the power consumption proportions to calculate each of the first power consumption proportion and the third power consumption proportion as 7/350, and calculate each of the second power consumption proportion and the fourth power consumption proportion as 5/350. In this example, the total value of the power consumption proportions when executing the first operation fourteen times, the second operation fourteen times, the third operation fourteen times, and the fourth operation fourteen times is expressed by the following formula (1).

$$(7 \times 14 + 5 \times 14 + 7 \times 14 + 5 \times 14)/350 = 336/350 \qquad (1)$$

In this case, since the total value of the power consumption proportions does not exceed 1 even when making the robotic system 10 execute the fifteenth round of the first operation, the control device 90 determines that the remaining charge of the battery 40 for executing the first operation is reserved. Further, in the example described above, the total value of the power consumption proportions when executing the first operation fifteen times, the second operation fifteen times, the third operation fourteen times, and the fourth operation fourteen times is expressed by the following formula (2).

$$(7\times15+5\times15+7\times14+5\times14)/350=348/350 \quad (2)$$

In this case, since the total value of the power consumption proportions exceeds 1 when making the robotic system 10 execute the fifteenth round of the third operation, the control device 90 does not determine that the remaining charge of the battery 40 for executing the third operation is reserved. Further, in the example described above, the total value of the power consumption proportions when executing the first operation fifty times, the second operation zero times, the third operation zero times, and the fourth operation zero times is expressed by the following formula (3).

$$(7\times50+5\times0+7\times0+5\times0)/350=350/350 \quad (3)$$

In this case, since the total value of the power consumption proportions exceeds 1 when making the robotic system 10 execute the fifty first round of the first operation, the control device 90 does not determine that the remaining charge of the battery 40 for executing the first operation is reserved. In other words, the control device 90 limits the number of times the robotic system 10 is made to execute each of the operations to not higher than the upper-limit number of times at a maximum.

When it has been determined in the step S210 that the remaining charge of the battery 40 for executing the first operation is reserved, the control device 90 makes the robotic system 10 execute the first operation in the step S220. In the step S230, the control device 90 counts the number of times the first operation has been executed since the battery 40 was fully charged, and then stores the result using the number-of-times of operation counting section 95.

In the step S240, the control device 90 determines whether or not any other operations are registered in the operation sequence. When it has been determined in the step S240 that another operation is registered in the operation sequence, the control device 90 returns the process to the step S210, and then executes the processing from the step S210 to the step S240 once again. In the present embodiment, since the second operation, the third operation, and the fourth operation are registered in the operation sequence besides the first operation, the control device 90 determines in the step S240 that another operation is registered in the operation sequence. The control device 90 determines in the second round of the step S210 whether or not the remaining charge of the battery 40 for executing the second operation as second one of the operations represented by the operation sequence is reserved, and when it is determined that the remaining charge of the battery 40 for executing the second operation is reserved, the control device 90 makes the robotic system 10 execute the second operation in the second round of the step S220. In the second round of the step S230, the control device 90 counts the number of times the second operation has been executed since the battery 40 was fully charged, and then stores the result using the number-of-times of operation counting section 95.

The control device 90 repeatedly executes the processing from the step S210 to the step S240 until it becomes no longer determined in the step S240 that another operation is registered in the operation sequence. When it has not been determined in the step S240 that another operation is registered in the operation sequence, the control device 90 terminates this process.

When it has not been determined in the step S210 that the remaining charge of the battery 40 for executing the first operation is reserved, the control device 90 does not make the robotic system 10 execute the first operation, but obtains the output voltage of the battery 40 using the voltage acquisition section 91 in the step S260, and then determines in the step S270 whether or not the output voltage of the battery 40 is not higher than the threshold value stored in the voltage threshold value storage section 92. When it has not been determined in the step S270 that the output voltage of the battery 40 is not higher than the threshold value stored in the voltage threshold value storage section 92, the control device 90 skips the processing in the step S280 to proceed the process to the step S290. In contrast, when it has been determined in the step S270 that the output voltage of the battery 40 is not higher than the threshold value stored in the voltage threshold value storage section 92, the control device 90 executes in the step S280 the correction of deceasing the upper-limit number of times. In the present embodiment, the control device 90 decrements the value of the denominator of the power consumption proportions by one to thereby correct the upper-limit number of times. For example, when the first upper-limit number of times is fifty, and the value of the denominator of the power consumption proportions is 350, the control device 90 decreases the value of the denominator proportions from 350 to 349 to thereby correct the first upper-limit number of times from fifty to 349/7. The upper-limit numbers of times thus corrected are stored in the respective upper-limit number-of-times storage sections 94A through 94D. It should be noted that it is possible for the control device 90 to execute the correction of decreasing the value of the denominator of the power consumption proportions by two or more, or to decrease the upper-limit number of times itself instead of decreasing the upper-limit number of times by decreasing the value of the denominator of the power consumption proportions.

In the step S290, the control device 90 announces the fact that it is necessary to charge the battery 40 using the announcing section 43. Subsequently, the control device 90 terminates this process. When the predetermined start command is supplied to the control device 90 after the battery 40 is fully charged, the control device 90 executes this process once again.

According to the robotic system 10 related to the present embodiment described hereinabove, the control device 90 executes the upper-limit number-of-times setting process prior to the operation sequence execution process to thereby store the upper-limit numbers of times of the operations in the period from when the battery 40 has fully been charged to when the battery 40 is subsequently recharged in the respective upper-limit number-of-times storage sections 94A through 94D. Therefore, it is possible to manage the remaining charge of the battery 40 using the upper-limit number of times without imposing time and effort for calculating the power consumption on the user, and at the same time, even when the content of each of the operations is changed by the user, it is possible to store the upper-limit number of times of each of the operations thus changed in the respective upper-limit number-of-times storage sections 94A through 94D by making the control device 90 execute the upper-limit number-of-times setting process once again. In particular, in the present embodiment, since the control device 90 determines whether or not the remaining charge of the battery 40 for executing each of the operations is reserved using the upper-limit number of times in the operation sequence execution process, it is possible to prevent the robotic system 10 from stopping due to the shortage in remaining charge of the battery 40 during the execution of each of the operations. Further, in the present embodiment, it is possible to manage the remaining charge of the battery 40 in the robotic system 10 for executing the plurality of types of operations from the first operation to the fourth operation.

Further, in the present embodiment, when it has not been determined in the operation sequence execution process that the remaining charge of the battery 40 for executing the operation is reserved, whether or not the output voltage of the battery 40 is not higher than the threshold value stored in the voltage threshold value storage section 92 is determined without making the robotic system 10 execute the operation, and when it has been determined that the output voltage of the battery 40 is not higher than the threshold value stored in the voltage threshold value storage section 92, the correction of decreasing each of the upper-limit numbers of times is executed. Therefore, since it is possible to adjust each of the upper-limit numbers of times in accordance with the deterioration of the battery 40, it is possible to more surely prevent the robotic system 10 from stopping during the execution of each of the operations due to the shortage in the remaining charge of the battery 40.

Further, in the present embodiment, when the battery 40 is replaced, the control device 90 executes the upper-limit number-of-times setting process once again. Therefore, it is possible to manage the remaining charge of the battery 40 without being affected by the individual difference in the battery 40.

Further, in the present embodiment, since the robotic system 10 is configured so that the battery 40 can be replaced with a secondary cell different in type from the battery 40, it is possible to ensure the degree of freedom of the selection of the battery 40 by the user.

B. Other Embodiments (B1) In the robotic system 10 according to the embodiment described above, in the upper-limit number-of-times setting process shown in FIG. 4, the upper-limit numbers of times of the respective operations are stored in the respective upper-limit number-of-times storage sections 94. In contrast, in the upper-limit number-of-times setting process, it is possible to store the upper-limit number of times of just one operation in the upper-limit number-of-times storage section 94. In this case, it is not required to provide the processing in the step S170 to the upper-limit number-of-times setting process.

(B2) In the robotic system 10 described above, the processing from the step S260 to the step S280 is not required to be provided to the operation sequence execution process shown in FIG. 5. In other words, when it has not been determined in the step S210 that the remaining charge of the battery 40 for executing the operation is reserved, it is possible for the control device 90 to make the process proceed to the step S290.

(B3) In the robotic system 10 according to the embodiment described above, when the battery 40 is replaced, the control device 90 executes the upper-limit number-of-times setting process once again. In contrast, the control device 90 is not required to execute the upper-limit number-of-times setting process even when the battery 40 is replaced.

(B4) The robotic system 10 according to the embodiment described above is configured so that the battery 40 can be replaced with a secondary cell different in type from the battery 40 having been installed. In contrast, it is possible for the robotic system 10 to be configured so that the battery 40 can be replaced with a secondary cell the same in type as the battery 40 having been installed.

(B5) In the robotic system 10 according to the embodiment described above, the robot 20 and the vehicle section 30 are driven using the battery 40 as the power supply source. In contrast, it is possible for the robot 20 to be driven using the battery 40 as the power supply source, and it is possible for the vehicle section 30 to be driven by a power supply source different from the battery 40.

(B6) The robotic system 10 according to the embodiment described above is provided with the vehicle section 30. In contrast, the robotic system 10 is not required to be provided with the vehicle section 30. In this case, it is possible for the battery 40, the voltmeter 41, the charge connector 42, and the announcing section 43 to be provided to, for example, the robot 20.

(B7) It is possible for the robotic system 10 according to the embodiment described above to move to a charge point as a point for charging the battery 40 using the vehicle section 30 when it becomes necessary to charge the battery 40. In this case, for example, it is possible for the control device 90 to be provided with a first moving operation storage section for storing a first moving operation having the content that traveling from the first point to the charge point is performed by the vehicle section 30, and a first upper-limit number-of-times of moving storage section for storing a first upper-limit number-of-times of moving which is an upper limit of the number of times the control device 90 can make the robotic system 10 execute the first moving operation when the control device 90 makes the robotic system 10 execute only the first moving operation in the period from when the battery 40 has fully been charged to when the battery 40 is subsequently recharged. Thus, it is possible for the control device 90 to calculate the power consumption proportion of the first moving operation. When it has not been determined in the step S210 of the operation sequence execution process shown in FIG. 5 that the remaining charge of the battery 40 for executing the first operation is reserved, it is possible for the control device 90 to determine whether or not the remaining charge of the battery 40 for executing the first moving operation is reserved. When it has been determined that the remaining charge of the battery 40 for executing the first moving operation is reserved, it is possible for the control device 90 to make the vehicle section 30 move the robotic system 10 from the first point to the charge point. For example, when the first upper-limit number-of-times of moving is 350, the first moving power consumption proportion as the power consumption proportion of a single first moving operation is 1/350. In this case, since the total value of the power consumption proportions after executing the first operation fifteen times, the second operation fifteen times, the third operation fourteen times, and the fourth operation fourteen times since the battery 40 was fully charged is 348/350, even when further executing the first moving operation once, the total value of the power consumption proportions does not exceed 1. Therefore, when determining whether or not the remaining charge of the battery 40 for executing the first moving operation is reserved after executing the first operation fifteen times, the second operation fifteen times, the third operation fourteen times, and the fourth operation fourteen times since the battery 40 was fully charged, the control device 90 determines that the remaining charge of the battery 40 for executing the first moving operation is reserved. It should be noted that it is possible for the control device 90 to be provided with a second moving operation storage section for storing a second moving operation having the content that traveling from the second point to the charge point is performed by the vehicle section 30, and a second upper-limit number-of-times of moving storage section for storing a second upper-limit number-of-times of moving which is an upper limit of the number of times the control device 90 can make the robotic system 10 execute the second moving operation when the control device 90 makes the robotic system 10 execute only the second moving operation in the period from when the battery 40 has fully been charged to when the battery 40 is subsequently recharged.

C. Other Aspects

The present disclosure is not limited to the embodiments described above, but can be implemented in a variety of aspects within the scope or the spirit of the present disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to a first aspect of the present disclosure, there is provided a robotic system. The robotic system includes a robot driven using a battery as a power supply source, and a control device configured to control the robot. The control device executes a setting process of making the robot repeatedly execute a first operation from when the battery is fully charged to when an output voltage of the battery becomes not higher than a predetermined threshold value, and setting a number of times the robot executes the first operation in a range in which the output voltage of the battery is higher than the threshold value as a first upper-limit number of times which is an upper limit of a number of times the robot can be made to execute the first operation in a period from when the battery is fully charged to when the battery is recharged.

According to the robotic system of this aspect, it is possible to set the first upper-limit number of times due to the setting process. Therefore, it is possible to manage the remaining charge of the battery using the first upper-limit number of times without imposing time and effort for calculating the power consumption on the user, and at the same time, even when the content of the first operation is changed by the user, it is possible to set the first upper-limit number of times of the first operation thus changed by making the control device execute the setting process once again.

(2) In the robotic system according to the aspect described above, the control device may limit a number of times the robot is made to execute the first operation in the period from when the battery is fully charged to when the battery is recharged to not higher than the first upper-limit number of times.

According to the robotic system of this aspect, since the control device makes the robot execute the first operation within the range of not exceeding the first upper-limit number of times in the period from when the battery is fully charged to when the battery is recharged, it is possible to prevent the robot from stopping due to the shortage in the remaining charge of the battery during the execution of the first operation by the robot.

(3) In the robotic system according to the aspect described above, the control device may obtain the output voltage of the battery after the number of times the robot is made to execute the first operation reaches the first upper-limit number of times in the period from when the battery is fully charged to when the battery is recharged, and may execute a correction of decreasing the first upper-limit number of times when the output voltage of the battery obtained is not higher than the threshold value.

According to the robotic system of this aspect, it is possible to adjust the first upper-limit number of times in accordance with the deterioration of the battery. Therefore, it is possible to more surely prevent the robot from stopping due to the shortage in the remaining charge of the battery during the execution of the first operation by the robot.

(4) In the robotic system according to the aspect described above, in the setting process, the control device may make the robot repeatedly execute only a second operation from when the battery is fully charged to when the output voltage of the battery becomes not higher than a predetermined threshold value after the first upper-limit number of times is set and the battery is fully recharged, and then set a number of times the robot executed only the second operation within a range in which the output voltage of the battery is higher than the threshold value as a second upper-limit number of times which is an upper limit of a number of times the robot can be made to execute the second operation in the period from when the battery is fully charged to when the battery is recharged.

According to the robotic system of this aspect, it is possible to manage the remaining charge of the battery in the robot which performs a plurality of types of operations.

(5) In the robotic system according to the aspect described above, the control device may execute the setting process when the battery is replaced.

According to the robotic system of this aspect, it is possible to manage the remaining charge of the battery without being affected by the individual difference in the battery.

(6) In the robotic system according to the aspect described above, there may be adopted a configuration in which the battery is replaceable with a battery different in type from the battery.

According to the robotic system of this aspect, it is possible to ensure the degree of freedom of selection of the battery by the user.

(7) According to a second aspect of the present disclosure, there is provided a control device configured to control a robot driven using a battery as a power supply source. The control device includes a voltage acquisition section configured to obtain an output voltage of the battery, and an upper-limit number-of-times storage section configured to store an upper-limit number of times which is an upper limit of a number of times the robot can be made to execute an operation in a period from when the battery is fully charged to when the battery is recharged. The control device executes a setting process of making the robot repeatedly execute the operation from when the battery is fully charged to when the output voltage of the battery obtained by the voltage acquisition section becomes not higher than a predetermined threshold value to obtain a number of times the robot executed the operation within a range in which the output voltage of the battery is higher than the threshold value, and then storing the number of times obtained in the upper-limit number-of-times storage section as the upper limit number of times.

According to the control device of this aspect, it is possible to store the upper-limit number of times which is the upper limit of the number of times the operation can be executed due to the setting process. Therefore, it is possible to manage the remaining charge of the battery using the upper-limit number of times without imposing time and effort for calculating the power consumption on the user, and at the same time, even when the content of the operation is changed by the user, it is possible to store the upper-limit number of times of the operation thus changed by making the control device execute the setting process once again.

The present disclosure can be implemented in a variety of aspects other than the robotic system. For example, the present disclosure can be implemented as aspects such as a control device for a robot.

What is claimed is:

1. A robotic system comprising:
   a robot driven using a battery as a power supply source; and
   a control device configured to control the robot, wherein
   the control device executes a setting process of making the robot repeatedly execute a first operation from when the battery is fully charged to when an output voltage of the battery becomes not higher than a predetermined threshold value, and setting a number of times the robot executes the first operation in a range in which the output voltage of the battery is higher than the threshold value as a first upper-limit number of times which is an upper limit of a number of times the robot can be made to execute the first operation in a period from when the battery is fully charged to when the battery is recharged,
   the control device obtains the output voltage of the battery after the number of times the robot is made to execute the first operation reaches the first upper-limit number of times in the period from when the battery is fully charged to when the battery is recharged, and executes a correction of decreasing the first upper-limit number of times when the output voltage of the battery obtained is not higher than the threshold value.

2. The robotic system according to claim 1, wherein
   the control device limits a number of times the robot is made to execute the first operation in the period from when the battery is fully charged to when the battery is recharged to not higher than the first upper-limit number of times.

3. The robotic system according to claim 1, wherein
   the control device executes the setting process when the battery is replaced.

4. The robotic system according to claim 1, wherein
   a configuration in which the battery is replaceable with a battery different in type from the battery is adopted.

5. A robotic system comprising:
   a robot driven using a battery as a power supply source; and
   a control device configured to control the robot, wherein
   the control device executes a setting process of making the robot repeatedly execute a first operation from when the battery is fully charged to when an output voltage of the battery becomes not higher than a predetermined threshold value, and setting a number of times the robot executes the first operation in a range in which the output voltage of the battery is higher than the threshold value as a first upper-limit number of times which is an upper limit of a number of times the robot can be made to execute the first operation in a period from when the battery is fully charged to when the battery is recharged,
   in the setting process, the control device makes the robot repeatedly execute only a second operation from when the battery is fully charged to when the output voltage of the battery becomes not higher than a predetermined threshold value after the first upper-limit number of times is set and the battery is fully recharged, and then sets a number of times the robot executed only the second operation within a range in which the output voltage of the battery is higher than the threshold value as a second upper-limit number of times which is an upper limit of a number of times the robot can be made to execute the second operation in the period from when the battery is fully charged to when the battery is recharged.

6. A control device configured to control a robot driven using a battery as a power supply source, comprising:
   a voltage acquisition section configured to obtain an output voltage of the battery; and
   an upper-limit number-of-times storage section configured to store an upper-limit number of times which is an upper limit of a number of times the robot can be made to execute an operation in a period from when the battery is fully charged to when the battery is recharged, wherein
   the control device executes a setting process of making the robot repeatedly execute the operation from when the battery is fully charged to when the output voltage of the battery obtained by the voltage acquisition section becomes not higher than a predetermined threshold value to obtain a number of times the robot executed the operation within a range in which the output voltage of the battery is higher than the threshold value, and then storing the number of times obtained in the upper-limit number-of-times storage section as the upper limit number of times,
   the control device obtains the output voltage of the battery after the number of times the robot is made to execute the first operation reaches the first upper-limit number of times in the period from when the battery is fully charged to when the battery is recharged, and executes a correction of decreasing the first upper-limit number of times when the output voltage of the battery obtained is not higher than the threshold value.

* * * * *